US012523598B2

(12) United States Patent
Gao et al.

(10) Patent No.: US 12,523,598 B2
(45) Date of Patent: Jan. 13, 2026

(54) OZONE PHOTOMETER

(71) Applicant: NOAA, US DEPARTMENT OF COMMERCE, Silver Spring, MD (US)

(72) Inventors: Ru-Shan Gao, Boulder, CO (US); Steven Ciciora, Superior, CO (US)

(73) Assignee: UNITED STATES OF AMERICA, AS REPRESENTED BY THE SECRETARY OF COMMERCE, Silver Spring, MD (US)

( * ) Notice: Subject to any disclaimer, the term of this patent is extended or adjusted under 35 U.S.C. 154(b) by 452 days.

(21) Appl. No.: 18/093,008

(22) Filed: Jan. 4, 2023

(65) Prior Publication Data
US 2023/0266237 A1   Aug. 24, 2023

Related U.S. Application Data

(60) Provisional application No. 63/311,487, filed on Feb. 18, 2022.

(51) Int. Cl.
G01N 21/33     (2006.01)
G01N 1/22      (2006.01)
G01N 1/24      (2006.01)
G01N 1/40      (2006.01)

(52) U.S. Cl.
CPC .......... *G01N 21/33* (2013.01); *G01N 1/2273* (2013.01); *G01N 1/24* (2013.01); *G01N 1/4077* (2013.01); *G01N 2001/245* (2013.01)

(58) Field of Classification Search
None
See application file for complete search history.

(56) References Cited

U.S. PATENT DOCUMENTS 4,018,562 A * 4/1977 Parks ................... G01N 21/766
                                                    422/52
5,092,220 A * 3/1992 Rounbehler ....... G01N 33/0037
                                                    73/167

(Continued)

OTHER PUBLICATIONS

Aimedieu, P. and Barat, J.: Instrument to measure stratospheric ozone with high resolution, Rev. Sci. Instrum., 52, 432-437, 1981.

(Continued)

*Primary Examiner* — Marcus H Taningco
*Assistant Examiner* — Djura Malevic

(57) ABSTRACT

Embodiments of the present invention relate to an apparatus for detecting ozone in ambient air, including an absorption cell with a bounded chamber for receiving air sample for analysis, a light source positioned to transmit light through absorption cell, a detector positioned to measure the attenuation of light passing through absorption cell, a pumping system for transporting ambient air into chamber and then reversing direction to transport ozone-free air into the absorption cell for purging the chamber, a scrubber positioned downstream from outlet port of the absorption cell to remove ozone from sample air exiting the absorption cell, a relative humidity (RH) equalizer for controlling humidity of sample air exiting absorption cell such that the sample entering scrubber has relatively the same humidity as ambient air, and a data system for digitizing and processing output from detector.

20 Claims, 6 Drawing Sheets

(56) References Cited

U.S. PATENT DOCUMENTS

| | | | | |
|---|---|---|---|---|
| 5,571,724 | A * | 11/1996 | Johnson | G01N 33/0037 436/158 |
| 5,739,038 | A * | 4/1998 | Burrows | G01N 21/31 436/118 |
| 5,935,525 | A * | 8/1999 | Lincoln | B01D 53/007 422/177 |
| 6,044,689 | A * | 4/2000 | Yoshida | G01N 33/0037 73/31.03 |
| 6,096,557 | A * | 8/2000 | Tanaka | G01N 31/223 436/100 |
| 6,444,474 | B1 * | 9/2002 | Thomas | G01N 33/1846 422/68.1 |
| 6,694,799 | B2 * | 2/2004 | Small | G01N 21/1702 73/590 |
| 7,045,359 | B2 * | 5/2006 | Birks | G01N 33/0037 436/118 |
| 7,069,769 | B2 * | 7/2006 | Kung | G01N 21/33 73/24.02 |
| 8,349,260 | B2 * | 1/2013 | Wohltjen | G01N 33/0014 422/83 |
| 8,395,776 | B2 * | 3/2013 | Birks | G01N 21/33 436/118 |
| 8,897,955 | B2 * | 11/2014 | Stewart | F01N 11/007 701/34.4 |
| 9,140,644 | B2 * | 9/2015 | Wittmann | G01N 21/39 |
| 9,423,340 | B2 * | 8/2016 | Birks | C02F 1/78 |
| 9,625,372 | B2 * | 4/2017 | Bilenko | G01N 21/33 |
| 9,976,991 | B2 * | 5/2018 | Madhav | G01N 29/022 |
| 10,151,685 | B2 * | 12/2018 | Bilenko | G01N 21/11 |
| 10,295,517 | B2 * | 5/2019 | Birks | G01N 33/0039 |
| 10,309,915 | B2 * | 6/2019 | Tremblay | G01N 25/28 |
| 10,339,778 | B1 * | 7/2019 | Birnkrant | G01N 21/534 |
| 10,684,215 | B2 * | 6/2020 | Birks | G01N 21/5907 |
| 10,739,257 | B2 * | 8/2020 | Wittmann | G01J 3/433 |
| 10,768,135 | B2 * | 9/2020 | Chen | G01N 27/27 |
| 11,733,157 | B2 * | 8/2023 | Pearce | B64D 13/06 356/432 |
| 12,000,774 | B2 * | 6/2024 | Li | G01N 21/31 |
| 12,053,755 | B2 * | 8/2024 | Spartz | G01N 21/3504 |
| 2003/0159498 | A1 * | 8/2003 | Small | G01N 21/6486 73/590 |
| 2004/0018630 | A1 * | 1/2004 | Birks | G01N 33/497 436/116 |
| 2004/0112117 | A1 * | 6/2004 | Wright | G01M 3/20 73/25.01 |
| 2005/0160791 | A1 * | 7/2005 | Kung | G01N 21/33 73/24.02 |
| 2006/0011844 | A1 * | 1/2006 | Oka | G01N 21/3504 250/343 |
| 2007/0269346 | A1 * | 11/2007 | Wohltjen | G01N 33/0014 422/83 |
| 2009/0208376 | A1 * | 8/2009 | Huang | G01N 27/125 422/98 |
| 2011/0201123 | A1 * | 8/2011 | Watson | G01N 33/0039 436/135 |
| 2011/0201124 | A1 * | 8/2011 | Schork | G01N 33/0039 436/135 |
| 2011/0259080 | A1 * | 10/2011 | Ratcliffe | G01N 27/12 427/126.3 |
| 2011/0303540 | A1 * | 12/2011 | Huang | G01N 27/125 204/416 |
| 2012/0062895 | A1 * | 3/2012 | Rao | G01N 33/0037 356/437 |
| 2016/0025696 | A1 * | 1/2016 | Birks | G01N 33/0039 250/435 |
| 2017/0016867 | A1 * | 1/2017 | Chung | G01N 33/0036 |
| 2019/0226987 | A1 * | 7/2019 | Birks | G01N 21/49 |
| 2020/0325049 | A1 * | 10/2020 | Roy | A61L 2/24 |
| 2022/0003664 | A1 * | 1/2022 | Pearce | B64D 13/06 |
| 2022/0090307 | A1 * | 3/2022 | Levy | B01D 53/261 |
| 2023/0266237 | A1 * | 8/2023 | Gao | G01N 1/4077 250/373 |

OTHER PUBLICATIONS

Andersen, P. C., Williford, C. J., and Birks, J. W.: Miniature Personal Ozone Monitor Based on UV Absorbance, Anal. Chem. 2010, 82, 7924-7928, 2010.

Asher, E., et al.: A novel network-based approach to determining measurement representation error for model evaluation, JGR Atmospheres, 2021, doi: 10.1029/2021JD035485.

Bowman, L. D. and Horak, R. F.: "A Continuous Ultraviolet Absorption Ozone Photometer," in Air Quality Instrumentation, vol. 2, edited by J. W. Scales, Instrument Society of America, Research Triangle Park, NC, 1974.

Brewer, A. W. and Milford J. R.: The Oxford-Kew ozone sonde, Proc. R. Soc. London, Ser. A, 256, 470-495, 1960.

Gao, R. S., Ballard, J., Watts, L. A., Thornberry, T. D., Ciciora, S. J., Mclaughlin, R. J. and Fahey, D. W.: A compact, fast UV photometer for measurement of ozone from research aircraft, Atmos. Meas. Tech., 5(9), 2201-2210, doi:10.5194/amt-5-2201-2012, 2012.

Gao, R. S.; Telg, H.; Mclaughlin, R. J.; Ciciora, S. J.; Watts, L. A.; Richardson, M. S.; Schwarz, J. P.; Perring, A. E.; Thornberry, T. D.; Rollins, A. W.; Markovic, M. Z.; Bates, T. S.; Johnson, J. E.; Fahey, D. W. A Light-Weight, High-Sensitivity Particle Spectrometer for PM2.5 Aerosol Measurements. Aerosol Science and Technology 2016, 50 (1), 88-99.

Kalnajs, L. E. and Avallone, L. M.: A Novel Lightweight Low-Power Dual-Beam Ozone Photometer Utilizing Solid-State Optoelectronics, J. Atmos. Oceanic Technol., 27, 869, doi: 10.1175/2009JTECHA1362.1, 2010.

Komhyr, W. D.: Electrochemical concentration cells for gas analysis, Ann. Geophys., 25, 203-210, 1969.

Maier, E. J., Aikin, A. C., and Ainsworth, J. E.: Stratospheric nitric oxide and ozone measurements using photoionization mass spectrometry and UV absorption, Geophys. Res. Lett. 5, 37-40, 1978.

Małecka, B., Łącz, A., Drożdż, E et al. Thermal decomposition of d-metal nitrates supported on alumina. J Therm Anal Calorim 119, 1053-1061 (2015). https://doi.org/10.1007/s10973-014-4262-9.

Proffitt, M. H. and Mclaughlin, R. J.: Fast-response dual-beam UV-absorption ozone photometer suitable for use on stratospheric balloons, Rev. Sci. Instrum., 54, 1719-1728, 1983.

Regener, V. H.: Measurement of Atmospheric Ozone with the Chemiluminescent Method, J. Geophys. Res., 69, 3795-3800, 1964.

Ridley, B. A., Grahek, F. E., and Walega, J. G.: A Small High-Sensitivity, Medium-Response Ozone Detector Suitable for Measurements from Light Aircraft, J. Atmos. Ocean. Tech., 9, 142-148, 1992.

Smit et al., Quality Assurance and Quality Control for Ozonesonde Measurements in GAW. https://tropo.gsfc.nasa.gov/shadoz/index/archive/nletter/GAW_201.pdf.

Veres, A. H., Sarlós, F., Varga, A., Szabó, G., Bozóki, Z., Motika, G., and Gyapjas, J.: Nd:YAG Laser-Based Photoacoustic Detection of Ozone: Comparison of Pulsed and Quasicontinuous Wave Operation and Field Tests, Spectroscopy Letters, 38:3, 377-388, 2005.

Washenfelder, R. A., Wagner, N. L., Dubé, W. P, and Brown, S. S.: Measurement of Atmospheric Ozone by Cavity Ring-down Spectroscopy, Environ. Sci. Technol., 45(7), 2938, doi:10.1021/es103340u, 2011.

Wilson, K. L. and Birks, J. W.: Mechanism and Elimination of a Water Vapor Interference in the Measurement of Ozone by UV Absorbance, Environ. Sci. Technol., 40, 6361, 2006.

\* cited by examiner

OZONE PHOTOMETER

CROSS-REFERENCE TO RELATED APPLICATION

This application claims the benefit of priority from U.S. Provisional Patent Application Ser. No. 63/311,487, filed on Feb. 18, 2022, and entitled "Ozone Photometer," the disclosure of which is incorporated herein by reference in its entirety.

STATEMENT REGARDING FEDERAL RIGHTS

The invention described herein was made with support from the National Oceanic and Atmospheric Administration (NOAA) of the United States Department of Commerce. The United States Government has certain rights in the invention.

FIELD OF THE INVENTION

The present disclosure relates generally to ozone detection, and more particularly, to an ozone photodetector.

BACKGROUND OF THE INVENTION

Ozone ($O_3$) is an air pollutant in the troposphere but absorbs solar ultraviolet light (UV) in the stratosphere. In the troposphere, ozone has a lifetime of days to weeks and its concentrations continuously evolve through photochemistry and dynamic processes such as mixing and deposition. Surface ozone can be rapidly produced under poor air quality conditions and warm temperatures in the troposphere resulting in substantial spatial heterogeneity.

Typical techniques used for in situ ozone measurements include UV absorption, chemiluminescence, electrochemistry, photoacoustic spectroscopy, chemical conversion and cavity ring-down spectroscopy. UV absorption is widely used in research and monitoring. Devices based on the electrochemistry technique are light weight and uses less power and are often used for atmospheric profiling with weather balloons. However, the electrochemistry-based ozone sensors need careful and time-consuming preparation before use.

Ozone photometers based on the UV absorption technique have a simpler design, reliable, and are easier to use. The sensitivity and measurement speed of the ozone photometer are generally limiting factors for the minimum instrument size and weight. Compromises in performance are made to adapt ozone photometer to platforms such as unmanned aerial systems (UAS) or weather balloons with limited payload capacities.

FIG. 1 illustrates a conventional single-channel ozone photometer including a UV source (typically a mercury lamp with 253.7-nm photons), an absorption cell, and a sensor (typically a UV photodiode). Sample air and ozone-free air are alternately directed through the absorption cell using a three-way valve. Ozone absorbs photons near 253.7 nm and attenuates the UV beam passing through the cell containing ambient ozone more than through the same cell containing ozone-free air. The ozone partial pressure in the sample air can be determined from measured signals using Beer-Lambert law, and known ozone absorption cross section and the absorption path length. For a given optical system, the instrument precision generally improves with increasing absorption path length and sensor integration time.

A single-channel ozone photometer, as shown in FIG. 1, generally has a duty cycle of about 50%, because about half of the instrument's measurement time is used in measuring ozone-free air. The advantages of the single-channel instrument are low cost and smaller size. A disadvantage of this design for a moving platform, such as a UAS, is that measurements are not contiguous. A two-channel design with two synchronized three-way valves can double the duty cycle to about 100%. However, cost, complexity, weight and pumping requirement also double accordingly. Although the 3-way valves are either heavy and expensive, or with a significant flow restriction, they are required because the pumps used in ozone instruments are unidirectional.

A typical ozone photometer design usually is a compromise of several factors. The instrument sensitivity at a given sampling rate largely depends on absorption path length. The absorption path length is limited by the instrument form factor. Some designs use mirrors to bend the absorption path into a "U" shape in order to achieve a small form factor for portability. Ozone is chemically reactive and, in order to prevent ozone loss, the upstream surfaces of the UV sensor are generally be made of polytetrafluoroethylene (PTFE) or other ozone-compatible materials. High-conductance valves made of PTFE are also included, but they are generally bulky and consume high power. Time response in such photometers is partially determined by air flow rate, which in turn is limited by valve and pump sizes.

There is need for a spatially dense ozone monitoring stations that could improve ozone forecast and address the representation error in model-measurement inter-comparison. In particular, there is a need for ozone sensors capable of being mounted small UASs to track ozone evolutions in the boundary layer and lower free troposphere.

SUMMARY OF THE INVENTION

Embodiments of the present invention relate to an ozone photometer apparatus that eases the limitation of weight on the measurement sensitivity and speed, thus enabling development of light-weight ozone instruments suitable for UAS- or balloon-based applications. Embodiments of the present invention may also be used in the development and construction of low-cost ozone instrument for education and monitoring purposes.

Accordingly, embodiments of the present invention relate to an apparatus for detecting ozone in an air sample, including an absorption cell comprising a bounded chamber configured to contain the air sample, wherein the absorption cell comprises a first window positioned on a first end of the chamber and a second window positioned on a second end of the chamber, wherein the absorption cell comprises an inlet port for the air sample to enter the chamber and an outlet port for the air sample to exit the chamber; a light source positioned on the first end of the chamber to transmit light through the chamber, wherein a wavelength of the transmitted light substantially overlaps absorption wavelength of the ozone in the air sample; a detector positioned on the second end of the chamber to measure attenuation of the light transmitted through the chamber, wherein the detector comprises an optical sensor for generating an electrical signal in response to the attenuation of the light; a scrubber positioned downstream from the outlet port of the absorption cell to remove the ozone from the air sample exiting the chamber, wherein the scrubber removing the ozone from the air sample exiting the chamber generates ozone-free air; a bidirectional pump for transporting the air sample and the ozone-free air into the chamber, wherein the bidirectional pump transporting the air sample into the chamber operates in a forward direction, wherein the bidirectional pump transporting the ozone-free air into the chamber operates in a reverse direction; a relative humidity equalizer for adjusting relative humidity of the ozone-free air transported into the chamber, wherein the adjusted relative humidity of the ozone-free air transported into the chamber is substantially equal to relatively humidity of the air sample; and a data system comprising an analog-to-digital converter for converting the electrical signal generated by the optical sensor to a digital signal, wherein the data system processes the digital signal to determine a density of the ozone in the air sample. More particularly, the light source includes a light emitting diode emitting a beam of ultraviolet light, and the detector includes an ultraviolet light sensor. In one aspect of the present invention, the second window positioned on the second end of the chamber may further include an optical lens positioned to focus the light transmitted through the chamber onto the detector. In one embodiment, the optical lens is a ball lens.

In one embodiment of the present invention, the operating the bidirectional pump in the reverse direction includes transporting the ozone-free air into the chamber through the outlet port.

In some embodiments of the present invention, the scrubber includes a plurality of catalysts to consume the ozone in the air sample. For example, the plurality of the catalysts may be a mixture of manganese dioxide and copper oxide.

In other embodiments of the present invention, the detector further comprises an optical lens positioned to collect and focus the light transmitted through the chamber to the optical sensor.

Another embodiment of the present invention relates to an apparatus for detecting ozone in an air sample, including an absorption cell comprising a bounded chamber configured to contain the air sample, wherein the absorption cell comprises a first window positioned on a first end of the chamber and a second window positioned on a second end of the chamber, wherein the absorption cell comprises an inlet port for the air sample to enter the chamber and an outlet port for the air sample to exit the chamber; a light source positioned on the first end of the chamber to transmit light through the chamber, wherein a wavelength of the transmitted light substantially overlaps absorption wavelength of the ozone in the air sample; a detector positioned on the second end of the chamber to measure attenuation of the light transmitted through the chamber, wherein the detector comprises an optical sensor for generating an electrical signal in response to the attenuation of the light; a scrubber positioned downstream from the outlet port of the absorption cell to remove the ozone from the air sample exiting the chamber, wherein the scrubber removing the ozone from the air sample exiting the chamber generates ozone-free air into an exhaust line; a first fan positioned to draw the air sample into a main line, wherein the main line connects to an inlet line to the absorption cell and the exhaust line from the scrubber, wherein the exhaust line connected to the main line is positioned downstream from the inlet line, wherein the first fan is positioned downstream from the inlet line and the exhaust line; a bidirectional pump comprising a second fan and a third fan for transporting the air sample and the ozone-free air into the chamber, wherein the second fan and the third fan are positioned opposing each other to operate as a reversible pump, wherein the bidirectional pump transporting the air sample into the chamber operates in a forward direction, wherein the bidirectional pump transporting the ozone-free air into the chamber operates in a reverse direction; a relative humidity equalizer for adjusting relative humidity of the ozone-free air transported into the chamber, wherein the adjusted relative humidity of the ozone-free air transported into the chamber is substantially equal to relatively humidity of the air sample; and a data system comprising an analog-to-digital converter for converting the electrical signal generated by the optical sensor to a digital signal, wherein the data system processes the digital signal to determine a density of the ozone in the air sample. Other embodiment of the present invention further includes an inline filter positioned on the inlet line.

In one aspect of the present invention, the second and third fans operating as the reversible pump comprises the second fan transporting the air sample into the chamber when the third fan is off and the third fan transporting the ozone-free air into the chamber when the second fan is off. In one embodiment of the present invention, the first fan is a blower fan, and the second and third fans are tube axial fans.

Embodiments of the present invention also relate to an apparatus for detecting ozone in an air sample, including an absorption cell comprising a bounded chamber configured to contain the air sample, wherein the absorption cell comprises a first window positioned on a first end of the chamber and a second window positioned on a second end of the chamber, wherein the absorption cell comprises an inlet port for the air sample to enter the chamber and an outlet port for the air sample to exit the chamber; a light source positioned on the first end of the chamber to transmit light through the chamber, wherein a wavelength of the transmitted light substantially overlaps absorption wavelength of the ozone in the air sample; a detector positioned on the second end of the chamber to measure attenuation of the light transmitted through the chamber, wherein the detector comprises an optical sensor for generating an electrical signal in response to the attenuation of the light; a scrubber positioned downstream from the outlet port of the absorption cell to remove the ozone from the air sample exiting the chamber, wherein the removing the ozone from the air sample generates ozone-free air; a bidirectional pump for transporting the air sample and the ozone-free air into the chamber, wherein the bidirectional pump transporting the air sample into the chamber operates in a forward direction, wherein the bidirectional pump transporting the ozone-free air into the chamber operates in a reverse direction; a plurality of check valves for controlling the air sample flow and the ozone-free air flow into the chamber; a relative humidity equalizer for adjusting relative humidity of the ozone-free air transported into the chamber, wherein the adjusted relative humidity of the ozone-free air transported into the chamber is substantially equal to relatively humidity of the air sample; and a data system comprising an analog-to-digital converter for converting the electrical signal generated by the optical sensor to a digital signal, wherein the data system determines from the digital signal a density of the ozone in the air sample.

In one aspect of the present invention, the bidirectional pump operating in the forward direction closes the second and the fourth check valves and opens the first and the third check valves to allow the air sample to flow into the chamber through the inlet port, and wherein the bidirectional pump operating in the reverse direction closes the first and the third check valves and opens the second and the fourth check valves to allow the ozone-free air to flow into the chamber through the inlet port. In one embodiment of the present invention, the bidirectional pump is a compact rotatory vane pump.

In some embodiments of the present invention, the plurality of the check valves includes a first and second check valves for controlling the air sample flow and the ozone-free air flow into the chamber through the inlet port; and a third and fourth check valves for controlling the air sample flow and the ozone-free air flow exiting the chamber through the outlet port. In one embodiment of the present invention, the first, second, third and fourth check valves are diaphragm check valves.

DETAILED DESCRIPTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention. Reference will now be made to the drawings wherein like numerals refer to like elements throughout.

Figure 1:
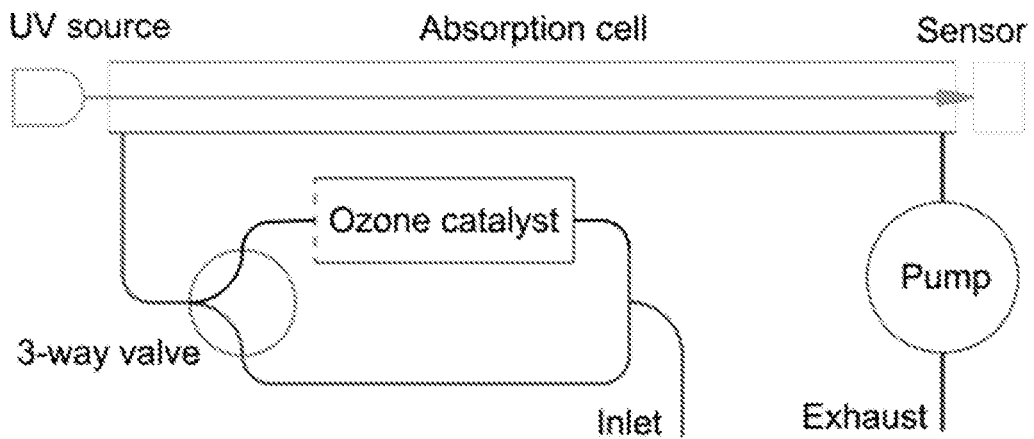
FIG. 1 illustrates a conventional single-channel ozone photometer.
Figure 2:
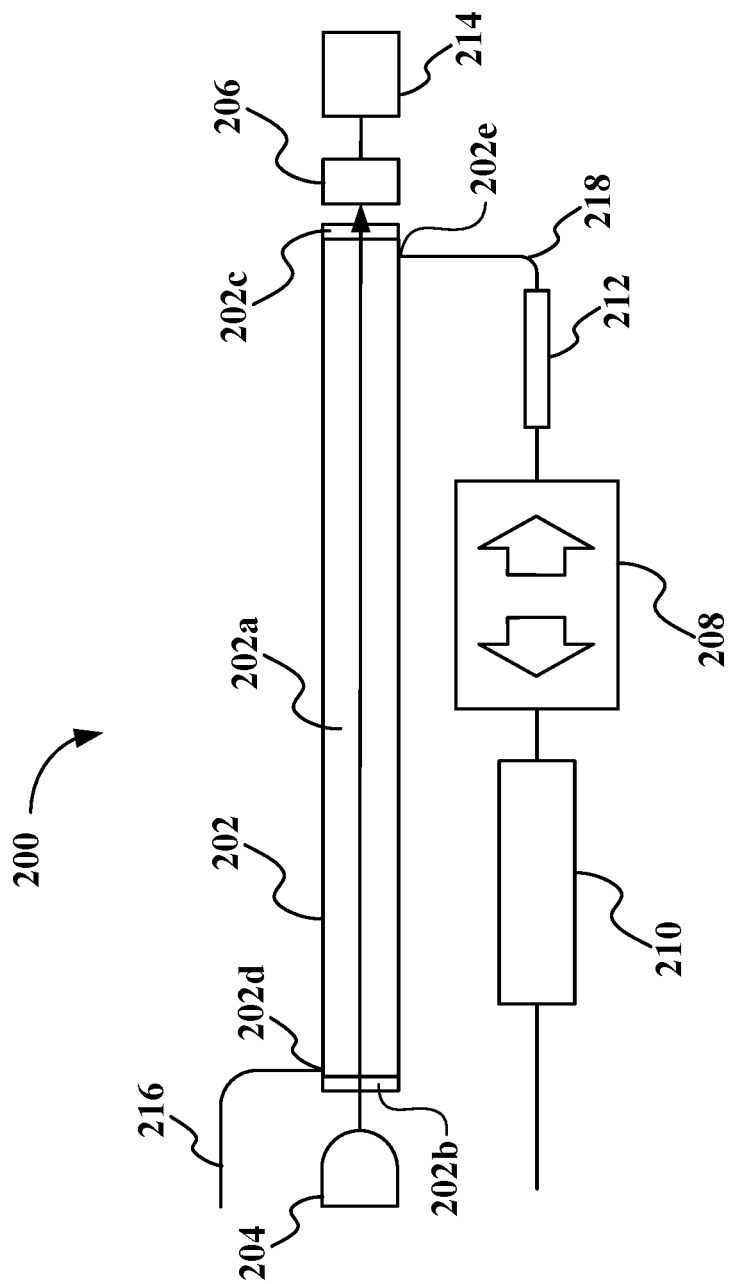
FIG. 2 illustrates an ozone photometer in accordance with an embodiment of the present invention.

Referring now to the drawings, and more particularly, to FIG. 2, there is shown an ozone photometer apparatus, generally designated 200 and schematically showing an embodiment of the present invention, for measuring ozone in an air sample. Ozone photometer apparatus 200 includes an absorption cell 202, a light source 204, a detector 206, a pumping system 208, a scrubber 210, a RH equalizer 212, and a data system 214. Typical operation cycle of an ozone photometer in accordance with one or more embodiments of the present invention includes a measure mode and a zero mode. During operation of ozone photometer in measure mode, sample air is drawn into absorption cell 202 during measurement of ozone in sample. During operation of ozone photometer in zero mode, ozone-free air is drawn into absorption cell 202 to purge ozone from absorption cell 202.

Absorption cell 202 includes a bounded chamber 202a for receiving and containing air sample for analysis. In one embodiment of the present invention, chamber 202a is a cylindrical tube. In accordance with various embodiments, the length of chamber 202a may be from about 30 centimeters (cm) to about 40 cm, outer diameter of chamber 202a is about 0.95 cm, and inner diameter of chamber 202a is about 0.64 cm. In an exemplary embodiment of the present invention, chamber 202a is made of PTFE. Chamber 202a may be encased by a metallic casing. Exemplary metallic casing that may be used to encase chamber 202a include aluminum tubing. Chamber 202a may also be capped at opposite ends using transparent windows and sealed on both ends. In some embodiments of ozone photometer apparatus 200 in accordance with the present invention, a second absorption cell may be included for receiving additional air sample for analysis.

Absorption cell 202 may include a first window 202b positioned on a proximal end of chamber 202a that is capable of allowing light to enter chamber 202a and a second window 202c positioned on a distal end of chamber 202a that is capable of allowing light to exit chamber 202a. In one embodiment of the present invention, first and second windows 202b-c are transparent to UV radiation at wavelengths above 250 nm. An exemplary UV transmitting material for use as first window 202b is quartz, where transmission for a 10 millimeter (mm) thick material may exceed 90% at 250 nm wavelength of light. In some embodiments of the present invention, second window 202c may include a ball lens positioned to focus the UV light onto detector 206. In one embodiment of the present invention, absorption cell 202 may be fitted with a narrowband filter adjacent to second window 202c to allow altered light to exit absorption cell 202, to eliminate undesired light that might leak into detector 206, and to eliminate undesired emissions from the UV light source, which could otherwise introduce a correction of about 0.5%. Absorption cell 202 further includes an inlet port 202d for allowing air sample in inlet line 216 to enter chamber 202a and an outlet port 202e for allowing air sample to exit chamber 202a through an exhaust line 218. In some embodiments of the present invention, absorption cell 202 further includes ports located at predetermined locations to accommodate sensors capable of measuring sample volume-flow rate, sample air temperature and pressure inside chamber 202a.

Light source 204 is positioned on a proximal end of absorption cell 202 to transmit light through chamber 202a of absorption cell 202. Light source 204 is capable of emitting radiation having a wavelength or range of wavelengths of radiation designed to overlap a wavelength or wavelength range where the target gas has a high degree of absorption. The presence of a target gas may be detected by the attenuation of electromagnetic radiation directed into chamber 202a when at least some photons of the radiation are absorbed by the gas. In one embodiment of the present invention, light source 204 includes ultraviolet light emitting diode (UV-LED) that emits a beam of ultraviolet light. UV-LEDs are more compact, stable, and easier to control than mercury lamps. The spectrum of a UV-LED is broad (~13 nm wide at FWHM) compared to the mercury 253.7 nm line. Ozone densities can be determined using Beer-Lambert law by incorporating the UV-LED spectrum in the following manner:

$$n(T) = \frac{\ln\left(\frac{I_0}{I}\right)}{L \int_{\lambda_l}^{\lambda_u} f(\lambda)\sigma(\lambda, T)} \quad (1)$$

where n is ozone density, T is temperature of air sample, $I_0$ and I are UV beam intensities in the zero and measure modes, $\lambda$ is UV wavelength, u and l represent the range of the UV spectral distribution, $f(\lambda)$ is the normalized LED output as function of wavelength, $\sigma$ is the ozone absorption cross section, and L is cell length.

In some embodiments of the present invention, light source 204 may include a UV-LED that emits radiation overlapping in wavelength with an optical absorption peak in ozone centered around 254 nanometers (nm) for maximum detection sensitivity. In other embodiments, light source 204 includes a UV-LED that generates radiation having a wavelength of about 265 nm for low cost and long lifetime.

Detector 206 is positioned on a distal end of absorption cell 202 to measure the attenuation of light transmitted through absorption cell 202. Detector 206 includes a UV sensor that facilitates accurate detection of concentration of a gas such as ozone and is not sensitive to background electromagnetic radiation from the sun during normal operation. In one embodiment of the present invention, detector 206 includes a UV sensor that is not sensitive to radiation having wavelengths greater than 290 nm. The UV sensor may be a photodiode with built-in amplifier or other photomultiplier tube known in the art. In some embodiments of the present invention, detector 206 includes an optical sensor mounted in a window, such as a quartz window, mounted on a proximal end of absorption cell 202. Detector 206 may include a detector lens that is arranged to collect a beam of parallel light and to focus the beam to a sensing element of the optical sensor. In alternate embodiments of the present invention, an optical filter may be positioned in front of detector 206 to reduce optical artifacts.

Pumping system 208 includes a bidirectional pump capable of conducting ambient air into chamber 202a via inlet port 202d from inlet line 216 and then reversing direction to conduct ozone-free air from scrubber 210 into absorption cell 202 for purging chamber 202a. When pumping system 208 is operated in a forward direction (measure mode), sample air is drawn into inlet line 216 and conducted through inlet line 216 and into chamber 202a via inlet port 202d. Operation of pumping system 208 in the forward direction further transports the sample air through chamber 202a and is drawn out of chamber 202a via outlet port 202e and into scrubber 210 and RH equalizer 212 via exhaust line 218. When pumping system 208 is operated in a reverse direction (zero mode), ambient air is drawn into scrubber 210 through exhaust line 218 and the ozone-free air exiting scrubber 210 is further transported through exhaust line 218 in the reverse direction into chamber 202a via outlet port 202e. Operation of pumping system 208 in the reverse direction further transports the ozone-free air through chamber 202a and is pushed out of chamber 202a via inlet port 202d. The air that is exhausted through exhaust line 218 during forward operation of pumping system 208 is carried away by air flow around exhaust line 218 and will not be pulled back into chamber 202a through inlet line 216 when pumping system 208 operates in forward direction to draw sample air back into chamber 202a through inlet line 216. A bidirectional differential pressure (dP) sensor is used for monitoring flow in inlet line 216 and exhaust line 218.

Referring to FIG. 2, ozone photometer apparatus 200 further includes a scrubber 210 positioned downstream from outlet port 202e and pumping system 208 to remove ozone from air entering absorption cell 202 via outlet port 202e along exhaust line 218 when pumping system 208 is operated in the reverse direction. Scrubber 210 includes a chamber with an inlet for receiving ambient air. Ozone-free air exiting scrubber 210 is sent to absorption cell 202 via outlet port 202e. Scrubber 210 chamber is generally filled with at least one catalyst capable of selectively consuming or destroying ozone in sample air. In one embodiment of the present invention, scrubber 210 chamber includes about 10 g of catalyst, which is generally sufficient to remove 1 ppm of ozone at a flow rate of 1 liter per minute. Exemplary catalyst that can be used for removing ozone from sample air include a mixture of manganese dioxide ($MnO_2$) and copper oxide (CuO), and the like. Scrubber 210 includes a filter positioned at an outlet for the scrubber chamber for ensuring catalyst particles are not carried out from scrubber 210 by sample air exiting scrubber 210 and for ensuring catalyst particles are not carried into absorption cell 202 by ozone-free air. Exemplary filters that can be used in scrubber 210 chamber include PTFE membrane filters, and the like.

Embodiments of ozone photometer apparatus 200 in accordance with the present invention include a relative humidity (RH) equalizer 212 positioned downstream from outlet port 202e for controlling humidity of ozone-free air entering absorption cell 202 via outlet port 202e such that the relative humidity inside absorption cell 202 remains unchanged during measurement of ozone in sample air and during purging of absorption cell 202 with ozone-free air in zero mode. Exemplary material that can be used in RH equalizer 212 include perfluorosulfonic acid polymer tubing (e.g., Nafion™ tubing), and the like.

Ozone photometer apparatus 200 in accordance with embodiments of the present invention may further include sensors to measure ambient pressure, temperature and relative humidity (RH). These sensors may be discrete units or integrated multifunctional. Measurements of ambient pressure, temperature, and RH may be used for diagnostic purposes or for atmospheric physical and chemical analyses. Differential pressure sensors may also be used for sample and zero air flow measurements. Additional temperature sensors may be placed at various locations in ozone photometer apparatus 200 for diagnostic and control purposes.

Embodiments of ozone photometer apparatus 200 in accordance with the present invention further include a data system 214 with an analog-to-digital converter (ADC) for digitizing output from detector 206. In one embodiment of the present invention, output from detector 206 is digitized with 24-bit analog-to-digital converter (ADC) at a rate of about five conversions per second. Data system 214 also includes a microcontroller with a clock, a pump controller (e.g., "H" bridge DC motor controller), and pressure, temperature and RH sensors. In an exemplary embodiment of the present invention, microcontroller has about 55 I/O pins and up to about 18 10-bit analog input channels. Data system 214 also includes a storage device for storing digitized output from detector 206 and various housekeeping data.

Figure 3:
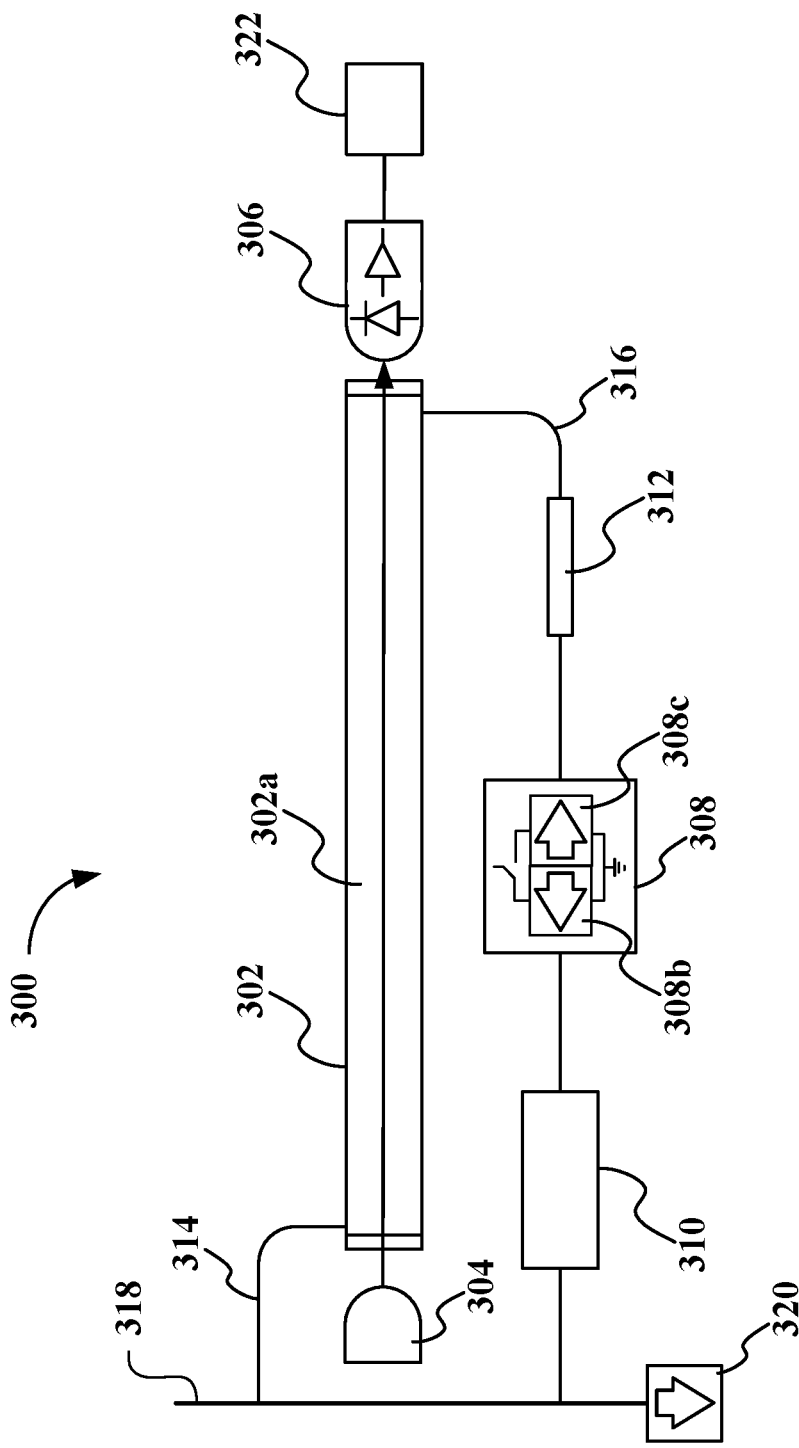
FIG. 3 illustrates an alternate embodiment of an ozone photometer in accordance with the present invention.

FIG. 3 illustrates a schematic of an ozone photometer apparatus 300 in accordance with an embodiment of the present invention, including an absorption cell 302, a light source 304, a detector 306, a bidirectional pump 308, a scrubber 310, a RH equalizer 312, fan 320, and a data system 322. Pumping system in ozone photometer apparatus 300 includes a first fan 320 positioned to draw ambient air through a main line 318 and bidirectional pump 308 having a second fan 308b and a third fan 308c arranged to direct sample air flows in a forward and a reverse direction. Fan 320 is positioned downstream from an inlet line 314 into absorption cell 302 and an exhaust line 316 from scrubber 310, and inlet line 314 is positioned upstream from exhaust line 316. When fan 320 draws ambient air into a main line 318, sample air is drawn into inlet line 314 first before the sample air in main line 318 mixes with ozone-free air in exhaust line 316 from scrubber 310. This ensures ozone-free air from scrubber 310 does not contaminate the sample ambient air being drawn into absorption cell 302 via inlet line 314. Second and third fans 308b-c are arranged facing in opposite directions such that fans 308b-c function as a reversible pump to draw a fraction of ambient air into absorption cell 302 when second fan 308b is switched on and third fan 308c is switched off or to push ozone-free air into absorption cell 302 when second fan 308b is switched off and third fan 308c is switched on. Exemplary first fan 320 that can be used to draw ambient air into main line 318 includes a blower fan capable of pulling air through a 20-m long, 9.5-mm inner diameter tube at a rate over 2 liters per minute. Exemplary second and third fans 308b-c include a tube axial fan type capable of generating a flowrate of about 0.5 liters per min.

Figure 4:
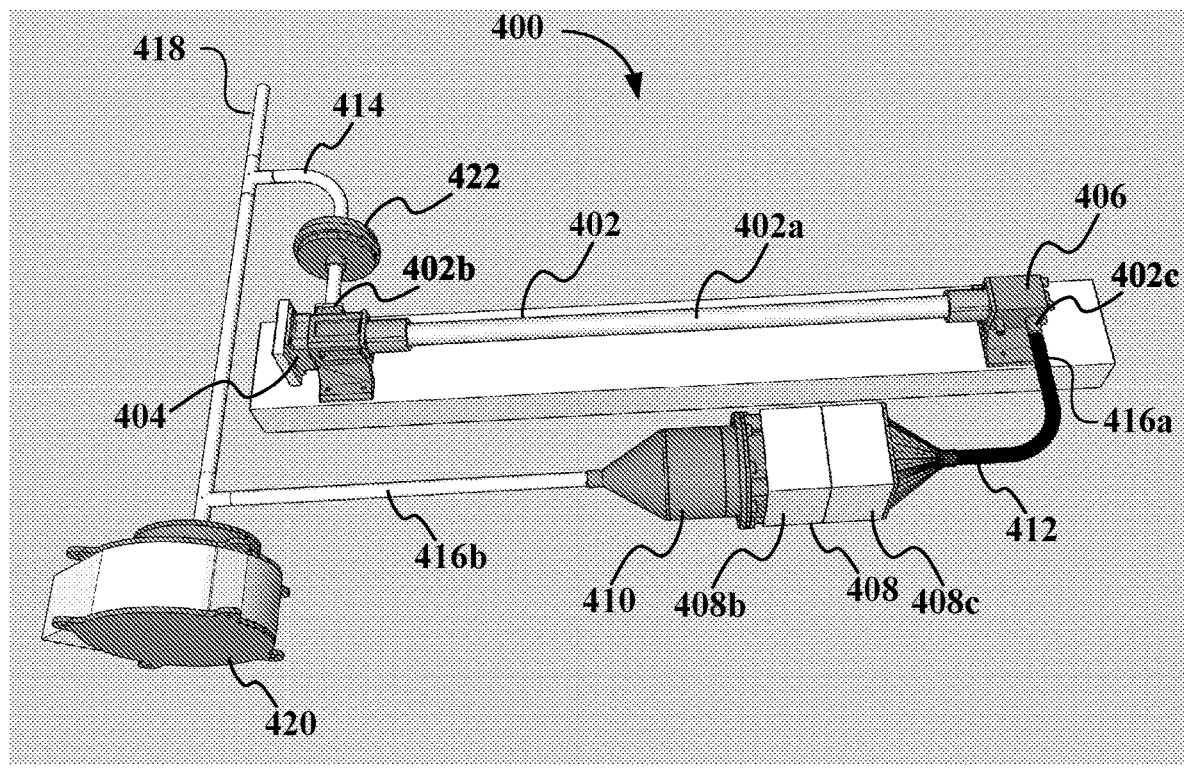
FIG. 4 illustrates an exemplary ozone photometer apparatus in accordance with the embodiment of the present invention shown in FIG. 3.

FIG. 4 illustrates an exemplary ozone photometer apparatus in accordance with the embodiment of the present invention shown in FIG. 3. During typical operation of ozone photometer apparatus 400 shown in FIG. 4, a first fan 420 positioned downstream from an inlet line 414 into absorption cell 402 and an exhaust line 416b from scrubber 410 draws ambient air into main line 418. A sample of the ambient air drawn via main line 418 flows into inlet line 414 and enters absorption cell 402 via inlet port 402b. The sample air is drawn into inlet line 414 first before the sample air in main line 418 mixes with ozone-free air in exhaust line 416b. An inline filter 422 positioned on sample inlet line 414 and between absorption cell 402 and main line 418 removes particles that may be present in the sample air entering absorption cell 402. A second fan 408b included in bidirectional pump 408 is switched on to further draw the sample air into absorption cell 402 such that the sample air to be analyzed enters and fills chamber 402a. Light source 404 transmits a light having a wavelength of about 265 nm into chamber 402a such that the transmitted light interacts with ozone in the sample air to generate an absorption optical signal. Detector 406 detects the absorption optical signal and converts the optical signal to an electrical signal. The electrical signal is transmitted to a data system, where the electrical signal is further converted to a digital signal by an analog-to-digital converter. Data system further processes the digital signal to determine the ozone density in the sample air using Beer-Lambert law.

Second fan 408b further draws the sample air out of absorption cell 402 via outlet port 402c into exhaust line 416a and directs the sample air into main line 418 via exhaust line 416b. Once the analysis of the sample air is complete, second fan 408b is switched off and a third fan 308c in bidirectional pump 408 is switched on to reverse the direction of air flow in exhaust line 416 such that sample air from main line 418 is drawn into exhaust line 416b and transported through scrubber 410 to generate ozone-free air. The ozone-free air passes through RH equalizer 412 to ensure the ozone-free air has the same RH as the ambient air and enters absorption cell 402 via outlet port 402c. The ozone-free air is allowed to flow into absorption cell 402 until the sample air in chamber 402a is flushed out of chamber 402a via inlet port 402b into sample inlet line 414 and further into main line 418.

Figure 5:
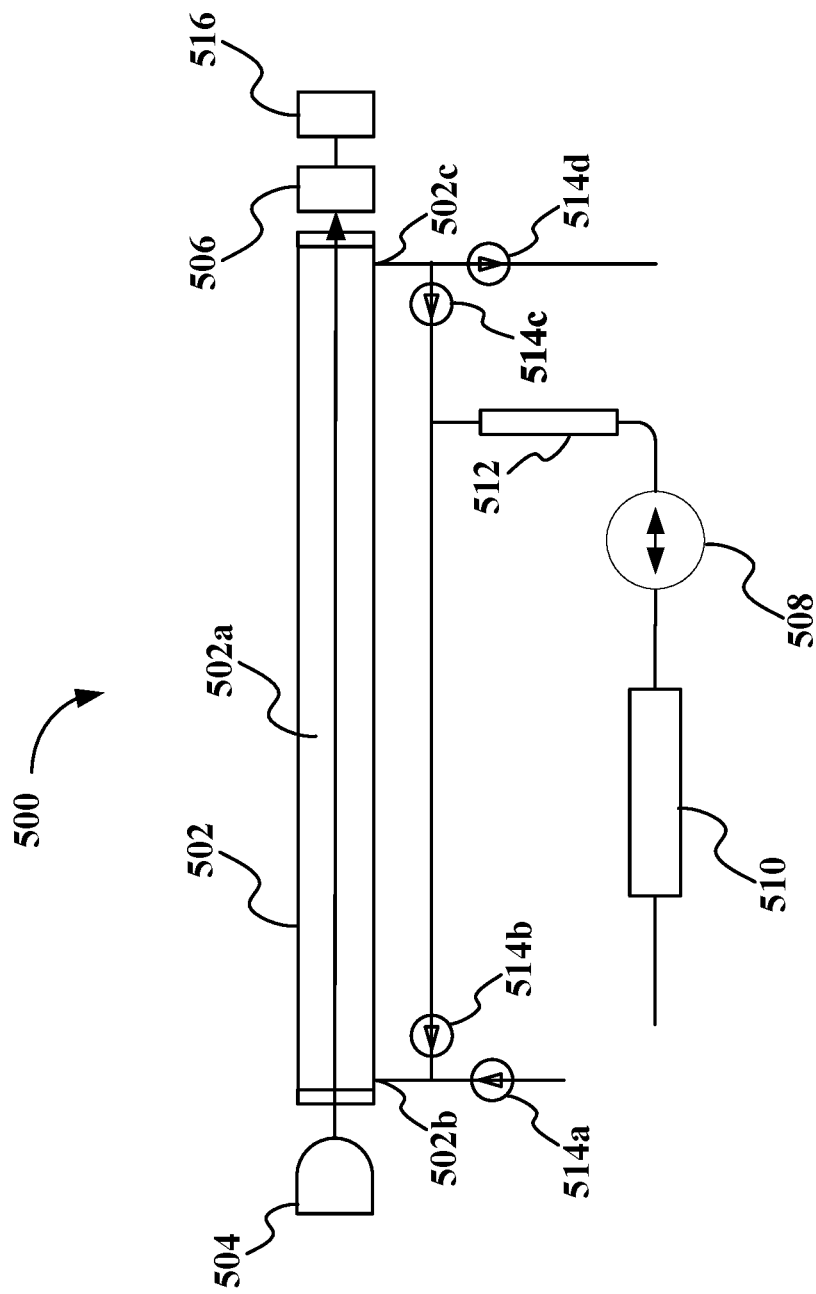
FIG. 5 illustrates an alternate embodiment of an ozone photometer in accordance with the present invention.

FIG. 5 illustrates a schematic of an ozone photometer apparatus 500 in accordance with another embodiment of the present invention, including an absorption cell 502, a light source 504, a detector 506, a bidirectional pump 508, a scrubber 510, a RH equalizer 512, check valves 514a-d, and a data system 516. Pumping system in ozone photometer apparatus 500 includes a bidirectional pump 508, which may function as a pump or a compressor depending on its rotational direction such that pump 508 is capable of directing sample air in the forward or reverse direction, and check valves 514a-d to direct sample air flow into chamber 502a of absorption cell 502 via inlet port 502b and to direct sample air flow out of chamber 502a via outlet port 502c. In one embodiment of the present invention, pump 508 is a compact rotatory vane pump weighing about 26 g and having a lifetime of about 1000 hours, and check valves 514a-d are diaphragm check valves that are operable without external power and are inert to ozone. When pump 508 draws air from outlet port 502c, check valves 514b and 514d closes due to pressure differences created by pump 508 across check valves 514b and 514d, and check valves 514a and 514c opens to allow sample air flow into chamber 502a of absorption cell 502 via inlet port 502b. When pump 508 reverses its pumping direction, check valves 514a and 514c closes, and check valves 514b and 514d opens to allow ozone-free air drawn from scrubber 510 to flow into chamber 502a of absorption cell 502 via inlet port 502b such that the flow direction of ozone-free air inside chamber 502a is the same flow direction as the sample air. This flow pattern prevents a turbulence-induced artifact in chamber 502a. The sample flow rate partially determines the response time of the instrument. The internal volume of chamber 502a is flushed using sample air between the two consecutive measurements. For an embodiment of the present invention having chamber 502a volume of about 12 cm$^3$, the sample flow rate is set to be from about 700 cm$^3$ s$^{-1}$ to about 1000 cm$^3$ s$^{-1}$ for a desired instrument response time of about 1 second. Embodiments of ozone photometer apparatus 500 optionally include a second absorption cell to enable continuous analysis of sample air. During an operation cycle of an embodiment of ozone photometer apparatus 500 including two absorption cells, one absorption cell operates to performs sample analysis while a second absorption cell is purged using ozone-free air and readied to perform sample analysis during the next cycle.

Figure 6:
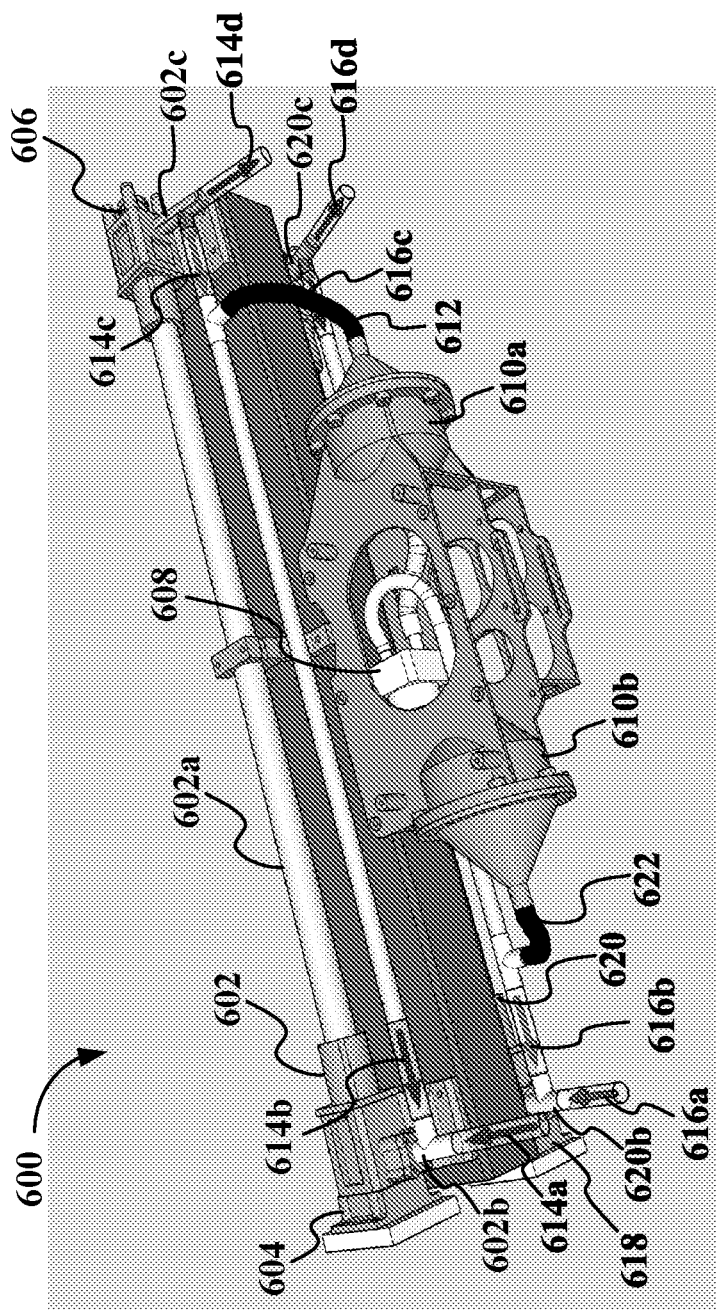
FIG. 6 illustrates an exemplary ozone photometer apparatus in accordance with the embodiment of the present invention shown in FIG. 5.

FIG. 6 illustrates an exemplary ozone photometer apparatus 600 in accordance with the embodiment of the present invention shown in FIG. 5. Ozone photometer apparatus 600, as shown in FIG. 6, includes a first absorption cell 602 and a second absorption cell 620 to enable continuous analysis of sample air. Absorption cell 602 is positioned as a top channel and absorption cell 620 is positioned as a bottom channel such that absorption cell 620 is purged using ozone-free air when absorption cell 602 operates to performs sample analysis and absorption cell 602 is purged using ozone-free air when absorption cell 620 operates to performs sample analysis. During a typical operation cycle of ozone photometer apparatus 600 shown in FIG. 6, bidirectional pump 608 operates in a forward direction during a first half cycle to direct sample air flow into chamber 602a of absorption cell 602 via inlet port 602b and exhausts sample air out of absorption cell 602 via exhaust port 602c after analysis. Operation of pump 608 in a forward direction during the first half cycle creates a pressure difference across check valves 614b and 614d causing check valves 614b and 614d to close and across check valves 616a and 616c causing check valves 616a and 616c to close. The closure of check valves 614b, 614d, 616a and 616c causes sample air exiting pump 608 to flow through scrubber 610b where the ozone is scrubbed from the sample air to generate ozone-free air. Ozone-free air from scrubber 610b enters absorption cell 620 via inlet port 620b and allowed to flow into absorption chamber 620a (not shown in FIG. 6) of absorption cell 620 until sample air in absorption chamber 620a is flushed out of absorption cell 620 via exhaust port 620c. During this first half cycle, absorption cell 602 is in a measure mode, and absorption cell 620 is in zero mode.

Pump 608 operates in a reverse direction during a second half cycle such that absorption cell 602 is in zero mode, and absorption cell 620 is in measure mode. Pump 608 operating in a reverse direction draws sample air into absorption cell 620 via inlet port 620b and exhaust sample air from absorption cell 620 via exhaust port 620c after analysis. Operation of pump 608 in a reverse direction during the second half cycle creates a pressure difference across check valves 614a and 614c causing check valves 614a and 614c to close and across check valves 616b and 616d causing check valves 616b and 616d to close. The closure of check valves 614a, 614c, 616b and 616d causes the sample air exiting pump 608 to flow through scrubber 610a where the ozone is scrubbed from the sample air to generate ozone-free air. Ozone-free air from scrubber 610a enters absorption cell 602 via inlet port 602b and allowed to flow into chamber 602a of absorption cell 602 until sample air in chamber 602a is flushed out of absorption cell 602 via exhaust port 602c.

Ozone scrubbers 610a and 610b are positioned adjacent to and on either side of pump 608 to prevent contamination of ozone-free air with ozone from potential air leaks at pump shaft. Ozone scrubbers may alter RH values of the ozone-free air. RH equalizers 612 and 622 are positioned adjacent to ozone scrubbers 610a and 610b to adjust the RH values of ozone-free air exiting ozone scrubbers 610a and 610b to about the RH value of ambient air. This ensures that the RH value of sample air or ozone-free air inside the absorption chambers 602a and 620a (not shown in FIG. 6) remain at ambient level. Check valves 614a-c ensure that flows of sample air and ozone-free air in absorption cell 602 are in the same direction to prevent generation of artifact signals from turbulence in the air flows. In one embodiment of the present invention check valves 614a-c ensure that flows of sample air and ozone-free air in absorption cell 602 are in a direction from inlet port 602b to exhaust port 602c. Check valves 616a-c ensure that flows of sample air and ozone-free air in absorption cell 620 are in the same direction to prevent artifact signals from turbulence in the air flows. In one embodiment of the present invention check valves 616a-c ensure that flows of sample air and ozone-free air in absorption cell 620 are in a direction from inlet port 620b to exhaust port 620c.

Light sources 604 and 618 transmit a light having a wavelength of about 255 nm into chambers 602a and 620a (not shown in FIG. 6) such that the transmitted light interacts with ozone in the sample air to generate an absorption optical signal. Detectors 606 and 624 (not shown in FIG. 6) detect the absorption optical signals and convert the optical signals to electrical signals. The electrical signals are transmitted to a data system where the electrical signals are further converted to digital signals by analog-to-digital converters. Data system further processes the digital signals to determine the ozone density in the sample air using Beer-Lambert law.

Ozone photometer apparatus in accordance with embodiments of the present invention has several advantages over previous ozone detection apparatus. The 265-nm LED light source in ozone photometer apparatus in accordance with embodiment as shown in FIGS. 3 and 4 of the present invention is more stable than traditional mercury lamps. Further, the use of 265-nm LED as the light source reduces cost of the apparatus. For example, a 265-nm LED costs almost a factor 10 less than a 255-nm LED and has a lifetime that is greater than about 10,000 hours. Any reduction in sensitivity by using 265 nm LED can be compensated by using a longer integration time. Embodiments of the present invention that do not include check valves, as shown in FIGS. 3 and 4, further reduces the cost of the apparatus. The measurement precision of the embodiment as shown in FIG. 4 is below ±1 part per billion mole mixing ratio (ppb) with 10-s integration time.

Ozone photometer apparatus in accordance with some embodiments of the present invention have reduced weight and increased robustness making the apparatus suitable for use with uncrewed aerial system (UAS) and balloon sonde that automatically transmits information about its surroundings from an inaccessible location and can be deployed from any location with minimum preparation time. Use of check valves, composite material, 3D printing, and modern electronics in ozone photometer apparatus in accordance with embodiments of the present invention reduces weight and power consumption, increases performance, and increases sample flow for high time resolution. Further, the apparatus is insensitive to sulfur dioxide, making it suitable for use in volcano plumes. The measurement precision of the embodiment as shown in FIG. 6 is about ±1 ppb at 1-$s$ time resolution.

Ozone photometer apparatus in accordance with embodiments of the present invention can be adapted to a variety of configurations suitable for selective ozone detection. Construction of apparatus, as described herein, provides flexibility to vary the shape of ozone photometer apparatus to fit specific spaces. It is thought that ozone photometer apparatus of the present invention and many of its attendant advantages will be understood from the foregoing description and it will be apparent that various changes may be made in the form, construction arrangement of parts thereof without departing from the spirit and scope of the invention or sacrificing all of its material advantages, the form hereinbefore described being merely a preferred or exemplary embodiment thereof.

What is claimed is:

1. An apparatus for detecting ozone in an air sample, said apparatus comprising:
    an absorption cell comprising a bounded chamber configured to contain the air sample, wherein the absorption cell comprises a first window positioned on a first end of the chamber and a second window positioned on a second end of the chamber, wherein the absorption cell comprises an inlet port for the air sample to enter the chamber and an outlet port for the air sample to exit the chamber;
    a light source positioned on the first end of the chamber to transmit light through the chamber, wherein a wavelength of the transmitted light substantially overlaps absorption wavelength of the ozone in the air sample;
    a detector positioned on the second end of the chamber to measure attenuation of the light transmitted through the chamber, wherein the detector comprises an optical sensor for generating an electrical signal in response to the attenuation of the light;
    a scrubber positioned downstream from the outlet port of the absorption cell to remove the ozone from the air sample exiting the chamber, wherein the scrubber removing the ozone from the air sample exiting the chamber generates ozone-free air;
    a bidirectional pump for transporting the air sample and the ozone-free air into the chamber, wherein the bidirectional pump transporting the air sample into the chamber operates in a forward direction, wherein the bidirectional pump transporting the ozone-free air into the chamber operates in a reverse direction;
    a relative humidity equalizer for adjusting relative humidity of the ozone-free air transported into the chamber, wherein the adjusted relative humidity of the ozone-free air transported into the chamber is substantially equal to relatively humidity of the air sample; and a data system comprising an analog-to-digital converter for converting the electrical signal generated by the optical sensor to a digital signal and a microcontroller comprising a pump controller, pressure sensor, temperature sensor and relative humidity sensor, wherein the data system processes the digital signal to determine a density of the ozone in the air sample.

2. The apparatus of claim 1, wherein the light source comprises a light emitting diode emitting a beam of ultraviolet light, and wherein the detector comprises an ultraviolet light sensor.

3. The apparatus of claim 1, wherein the second window positioned on the second end of the chamber further comprises an optical lens positioned to focus the light transmitted through the chamber onto the detector.

4. The apparatus of claim 3, wherein the optical lens is a ball lens.

5. The apparatus of claim 1, wherein the operating the bidirectional pump in the reverse direction comprises transporting the ozone-free air into the chamber through the outlet port.

6. The apparatus of claim 1, wherein the scrubber comprises a plurality of catalysts to consume the ozone in the air sample.

7. The apparatus of claim 6, wherein the plurality of the catalysts is a mixture of manganese dioxide and copper oxide.

8. The apparatus of claim 1, wherein the detector further comprises an optical lens positioned to collect and focus the light transmitted through the chamber to the optical sensor.

9. An apparatus for detecting ozone in an air sample, said apparatus comprising:
   an absorption cell comprising a bounded chamber configured to contain the air sample, wherein the absorption cell comprises a first window positioned on a first end of the chamber and a second window positioned on a second end of the chamber, wherein the absorption cell comprises an inlet port for the air sample to enter the chamber and an outlet port for the air sample to exit the chamber;
   a light source positioned on the first end of the chamber to transmit light through the chamber, wherein a wavelength of the transmitted light substantially overlaps absorption wavelength of the ozone in the air sample;
   a detector positioned on the second end of the chamber to measure attenuation of the light transmitted through the chamber, wherein the detector comprises an optical sensor for generating an electrical signal in response to the attenuation of the light;
   a scrubber positioned downstream from the outlet port of the absorption cell to remove the ozone from the air sample exiting the chamber, wherein the scrubber removing the ozone from the air sample exiting the chamber generates ozone-free air into an exhaust line;
   a first fan positioned to draw the air sample into a main line, wherein the main line connects to an inlet line to the absorption cell and the exhaust line from the scrubber, wherein the exhaust line connected to the main line is positioned downstream from the inlet line, wherein the first fan is positioned downstream from the inlet line and the exhaust line;
   a bidirectional pump comprising a second fan and a third fan for transporting the air sample and the ozone-free air into the chamber, wherein the second fan and the third fan are positioned opposing each other to operate as a reversible pump, wherein the bidirectional pump transporting the air sample into the chamber operates in a forward direction, wherein the bidirectional pump transporting the ozone-free air into the chamber operates in a reverse direction;
   a relative humidity equalizer for adjusting relative humidity of the ozone-free air transported into the chamber, wherein the adjusted relative humidity of the ozone-free air transported into the chamber is substantially equal to relatively humidity of the air sample; and
   a data system comprising an analog-to-digital converter for converting the electrical signal generated by the optical sensor to a digital signal and a microcontroller comprising a pump controller, pressure sensor, temperature sensor and relative humidity sensor, wherein the data system processes the digital signal to determine a density of the ozone in the air sample.

10. The apparatus of claim 9, wherein the second and third fans operating as the reversible pump comprises the second fan transporting the air sample into the chamber when the third fan is off and the third fan transporting the ozone-free air into the chamber when the second fan is off.

11. The apparatus of claim 9, wherein the first fan is a blower fan, and wherein the second and third fans are tube axial fans.

12. The apparatus of claim 9, further comprising an inline filter positioned on the inlet line.

13. The apparatus of claim 9, wherein the scrubber comprises a plurality of catalysts to consume the ozone in the air sample.

14. An apparatus for detecting ozone in an air sample, said apparatus comprising:
   an absorption cell comprising a bounded chamber configured to contain the air sample, wherein the absorption cell comprises a first window positioned on a first end of the chamber and a second window positioned on a second end of the chamber, wherein the absorption cell comprises an inlet port for the air sample to enter the chamber and an outlet port for the air sample to exit the chamber;
   a light source positioned on the first end of the chamber to transmit light through the chamber, wherein a wavelength of the transmitted light substantially overlaps absorption wavelength of the ozone in the air sample;
   a detector positioned on the second end of the chamber to measure attenuation of the light transmitted through the chamber, wherein the detector comprises an optical sensor for generating an electrical signal in response to the attenuation of the light;
   a scrubber positioned downstream from the outlet port of the absorption cell to remove the ozone from the air sample exiting the chamber, wherein the removing the ozone from the air sample generates ozone-free air;
   a bidirectional pump for transporting the air sample and the ozone-free air into the chamber, wherein the bidirectional pump transporting the air sample into the chamber operates in a forward direction, wherein the bidirectional pump transporting the ozone-free air into the chamber operates in a reverse direction;
   a plurality of check valves for controlling the air sample flow and the ozone-free air flow into the chamber;
   a relative humidity equalizer for adjusting relative humidity of the ozone-free air transported into the chamber, wherein the adjusted relative humidity of the ozone-free air transported into the chamber is substantially equal to relatively humidity of the air sample; and
   a data system comprising an analog-to-digital converter for converting the electrical signal generated by the optical sensor to a digital signal and a microcontroller comprising a pump controller, pressure sensor, temperature sensor and relative humidity sensor, wherein the data system determines from the digital signal a density of the ozone in the air sample.

15. The apparatus of claim 14, wherein the bidirectional pump is a compact rotatory vane pump.

16. The apparatus of claim 14, wherein the plurality of the check valves comprises:
   a first and second check valves for controlling the air sample flow and the ozone-free air flow into the chamber through the inlet port; and
   a third and fourth check valves for controlling the air sample flow and the ozone-free air flow exiting the chamber through the outlet port.

17. The apparatus of claim 16, wherein the bidirectional pump operating in the forward direction closes the second and the fourth check valves and opens the first and the third check valves to allow the air sample to flow into the chamber through the inlet port, and wherein the bidirectional pump operating in the reverse direction closes the first and the third check valves and opens the second and the fourth check valves to allow the ozone-free air to flow into the chamber through the inlet port.

18. The apparatus of claim 16, wherein the first, second, third and fourth check valves are diaphragm check valves.

19. The apparatus of claim 14, wherein the scrubber comprises a plurality of catalysts, and wherein the plurality of the catalysts consumes the ozone in the air sample.

20. The apparatus of claim 19, wherein the catalyst comprises a mixture of manganese dioxide and copper oxide.

* * * * *